UNITED STATES PATENT OFFICE.

ALBERT STRUPLER, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

COLOR-LAKE AND PROCESS OF MAKING SAME.

1,085,178.  Specification of Letters Patent.  Patented Jan. 27, 1914.

No Drawing.  Application filed April 15, 1913.  Serial No. 761,328.

*To all whom it may concern:*

Be it known that I, ALBERT STRUPLER, Ph. D., chemist, a citizen of the Republic of Switzerland, residing at Höchst-on-the-Main, Germany, have invented certain new and useful Improvements in Color-Lakes and Processes of Making Same, of which the following is a specification.

In U. S. Patent No. 1,043,271, dated November 5, 1912, is described the manufacture of pigment dyes or color-lakes prepared from the tetraalkyldiamino-para-chlorotriphenylmethane dyestuffs, commercially known as "malachite-green" and "brilliant-green".

Now I have found that by using 3-nitro-4-chloro-malachite-green and 3-nitro-4-chloro-brilliant-green respectively instead of the above mentioned dyestuffs, much more yellowish-green pigment dyes of great purity and great value are obtained. It has not been possible to obtain such pure yellowish-green tints, which supply a long-felt need, by the dyestuffs or mixtures therefrom hitherto used in the industry. The preparation of pigment dyes from the said dyestuffs is made by causing the dye solution, for example, one of the tetraethyl dyestuffs, to act upon a suspension of green-earth,—*i. e.* a naturally occurring magnesium-iron-aluminium-calcium-silicate, while thoroughly stirring, whereby insoluble pigments are precipitated which are compounds of the dyestuff with green-earth, being remarkable for their intense yellowish-green tint, their extraordinary fastness to light and lime, and their insolubility in water. The precipitation of the dyestuffs may also be effected by other precipitating agents, such, for instance, as tannin, soaps, solutions of resin, potassium silicate, or the like.

Having now described my invention, what I claim is:

1. The herein described process of preparing yellowish-green color-lakes, which consists in precipitating the tetraalkyl-diamino-3-nitro-4-chlorotriphenylmethane dyestuffs, substantially as described.

2. As new products, the herein described color-lakes, being compounds of the tetraalkyl-diamino-3-nitro-4-chlorotriphenyl-methane dyestuffs with precipitants, and being green powders of a bright tint, fast to water.

3. As a new product, the herein described color-lake, being a green-earth compound of the tetraethyl-diamino-3-nitro-4-chlorotriphenyl-methane dyestuffs, and being a green powder of a bright tint, fast to water, lime and light.

In testimony whereof, I affix my signature in presence of two witnesses.

ALBERT STRUPLER.

Witnesses:
  JEAN GRUND,
  CARL GRUND.